United States Patent [19]

Leber et al.

[11] Patent Number: 4,704,535

[45] Date of Patent: Nov. 3, 1987

[54] ULTRAVIOLET DOSIMETRY

[75] Inventors: Leland C. Leber; Neal L. Tenhulzen, both of Fort Collins, Colo.

[73] Assignee: Teledyne Industries, Inc., Fort Collins, Colo.

[21] Appl. No.: 722,051

[22] Filed: Apr. 11, 1985

[51] Int. Cl.⁴ .............................................. G01J 1/42
[52] U.S. Cl. ................................................... 250/372
[58] Field of Search ....................................... 250/372

[56] References Cited

U.S. PATENT DOCUMENTS

| | | |
|---|---|---|
| 3,710,115 | 1/1973 | Jubb . |
| 3,742,240 | 6/1973 | Jonasson ............................ 250/372 |
| 3,917,948 | 11/1975 | Strutz . |
| 3,999,061 | 12/1976 | McLaughlin et al. . |
| 4,010,372 | 3/1977 | Adler et al. ......................... 250/372 |
| 4,212,535 | 7/1980 | Sander et al. . |
| 4,229,733 | 10/1980 | Tulenko et al. . |
| 4,279,254 | 7/1981 | Boschetti et al. . |
| 4,306,459 | 12/1981 | Williams . |
| 4,428,050 | 1/1984 | Pellegrino ........................... 250/372 |
| 4,485,306 | 11/1984 | Braunstein et al. ................. 250/372 |
| 4,535,244 | 8/1985 | Burnham . |

OTHER PUBLICATIONS

*The Principles of Optics*, pp. 389-403, 406-408, and 521-524, "Miscellaneous Optical Materials".

Primary Examiner—Janice A. Howell
Assistant Examiner—David P. Porte
Attorney, Agent, or Firm—Hugh H. Drake

[57] ABSTRACT

An ultraviolet radiation dosimeter is to be employed by a person the skin of whom has been protected by a substance tending to inhibit the transmission of the radiation therethrough and which substance has a predetermined value of inhibition. Disposed to the radiation is a sensor that develops a signal in correspondence to the level of the radiation. Responding to that signal is a processor which accumulates a representation of the magnitude of the signal as effectively integrated with an elapsed time of exposure of the sensor to the radiation. An indication of the degree of the accumulation is yielded in response to the representation of the magnitude. The value of inhibition is used in order selectively to adjust in correspondence thereto the determination of the degree at which the indication is yielded. Both analog and digital circuitry are presented, along with variations and additions such as also adjusting response in accordance with the skin type of the user.

13 Claims, 6 Drawing Figures

ULTRAVIOLET DOSIMETRY

The present invention pertains to ultraviolet radiation dosimetry. More particularly, it relates to a method that enables a user to receive a warning or other indication when the exposure of his skin to the sun becomes excessive, being able to adjust the determination to accommodate the use of a sun screen such as a lotion and also preferably being able to adjust with respect to the susceptiveness of his skin to the radiation.

Dosimetry methods and systems are now well known for use with respect to ionizing radiation as may occur in connection with X-rays, gamma rays and nuclear energy. Some dosimeters merely use photosensitive film which is developed to yield the degree of darkening by reason of the impingement of such radiation. Other detectors have been much more sophisticated, yielding results in terms of both instantaneous rate of dosage as well as accumulated dosage. An example of such an approach appears in U.S. Pat. No. 3,878,496-Erickson. Responding to a detector of ionizing radiation, comparisons are made and digital scaling circuitry enables an audio alarm to sound when an excess is determined.

Somewhat similar approaches have been employed in connection with what generally is lower-frequency radiation of the non-ionizing type. That description would apply generally to the entire visible light range, the extension of that range into the infrared region of the spectrum and the extension in the other direction into that known as the ultraviolet regions of the spectrum. Radiation anywhere within that portion of spectrum can cause damage to the tissue of a person.

Infrared radiation is not much of a problem to detect, because the user senses the heat or sees the "hot" color of a heating element. Unless extremely intense, as in the beam of a laser operating within the visible spectrum, radiation within the ordinarily visible portion of the spectrum is normally not considered to be a problem in terms of deleterious effects upon the tissues of a person. That portion of the spectrum is, of course, of great value to the livelihood of growing vegetation and other living organisms. Infrared radiation is typically detected by thermal means, because that is more convenient, and visible radiation often is detected by a photosensitive element like that employed within automatic cameras.

A somewhat peculiar problem occurs when dealing with that portion of the spectrum which is higher in frequency than what normally represents visible radiation and yet is below that which constitutes ionizing radiation. The wavelengths of naturally-occurring radiation in the ultraviolet range extend roughly from 285 nanometers to 400 nanometers.

The effects of ultraviolet radiation upon the skin of a person originally were largely unknown to the public at large. Persons at low altitude could expose their skin frequently all summer and only gradually develop a suntan. Other persons residing at higher altitudes, such as in the western part of the United States, experienced an aging of the skin which generally was attributed to being outdoors more and thereby exposed to the effects of wind and the like. For many, adverse experience was not encountered until they undertook outdoor activities in the mountains, such as hiking, camping and skiing. Many were surprised that they could develop even blisters from sunburn as a result of being out on a day when they never actually saw the sun because of overcast. The difference, of course, was that ultraviolet radiation penetrates through such overcast when visible sunlight does not and also because there is less atmosphere at higher altitudes to absorb or reflect ultraviolet radiation.

The result of these observations has been a growing public awareness of the dangers of excessive exposure to ultraviolet radiation even when not being exposed to visible radiation. At the same time, different manufacturers have entered the market with what usually are lotions and creams that sometimes carry the term "sun screen". The technical literature has assigned sun protection factors to such screening materials, usually ranging in a series of factors from 2 through 22. The higher the number, the greater the percentage of ultraviolet radiation which is inhibited from transmission to the skin.

Another dermatologic aspect is that which has become known as the susceptibility factor of the skin. Simply put, the susceptibility of any one person's skin to ultraviolet radiation well may be different from that of his neighbor or even that of other members of his family. The literature seems to be somewhat in agreement that the skin susceptibility factor can be catalogued within a range of about six characteristics. There is prior art which specifically addresses the adjustment of dosimetry apparatus to account for differences in skin susceptibility. An example of an approach which takes this direction is U.S. Pat. No. 4,229,733-Tulenko et al.

In this and in similar fields of dosimetry, a variety of devices are disclosed. Mere accumulation of a color indication in a substrate is the subject of U.S. Pat. Nos. 4,212,535-Sanders et al and 4,306,459-Williams. More complex circuitry ranges from U.S. Pat. No. 3,999,061-McLaughlin et al to the extemely involved digital circuitry of U.S. Pat. No. 4,279,254-Boschetti et al.

While the approaches represented by the various ones of the aforementioned patents were being developed and presented, dermatologists and others active in the field attempted to categorize the effects of ultraviolet exposure to the skin, in terms of cutaneous response. A standard definition is based upon the minimal erythemal dose or "MED". One MED is that dosage of a given wavelength or band of wavelengths which will just elicit a visible erythema (reddening) on a previously unexposed subject, or group of subjects of the same skin type, after a predetermined length of time following exposure. Some published studies made the subsequent determination at six to eight hours after exposure, while others desired to make the determination at something like twenty-four hours later. In both cases, the results were comparable. The following table sets forth that which is representative of the results of such studies:

| EXPOSURE LEVEL, MED | RESPONSE |
|---|---|
| 1 MED, One Time | Minimally perceptible erythema |
| 3 MED, One Time | Vivid erythema |
| 4–5 MED, One Time | Painful erythema (sunburn) |
| 8–10 MED, One Time | Painful erythema with blistering |
| 1 MED, Daily | Premature skin aging |
| 1 MED, Daily | Non-melanoma skin cancer |
| 1 MED, One Time | Photosensitive, photo allergic reactions |
| 2–3 MED, Daily | Optimal melanogenesis rate |
| 10–15 MED, 8–12 in lifetime | Melanoma |

In considering the table, it has to be recalled that there also is a relationship to skin type. For example, the ratio of one MED equivalent energy for skin type I to one MED equivalent energy for skin type VI is approximately 1:33. This indicates that a range of adjustment is required for a dosimeter in order to respond properly to dermal requirements. What the user desires is that which could be called optimal melanogenesis rate dosage. Melanogenesis would more commonly be called, simply, suntanning.

Apparatus, of the kind described in the prior art, and as represented by the references previously noted, is of course either built or later adjusted to allow proper accomodation or at least it should be. As has been shown, a number of different parameters must be considered. By and large, such prior apparatus took large steps forward in an attempt to the enablement of what might be called the "safe suntanning alarm". Nevertheless, such apparatus leaves a lot to be desired for either or both of the reasons of undue complexity or failure to consider all relevant factors.

It is, accordingly, a general object of the present invention to provide new and improved ultraviolet dosimetry which overcomes the aforeindicated disadvantages or deficiencies.

A related object of the invention is to be able to accomplish all of the desired aims while yet embodying apparatus which is simple to use and comparatively inexpensive to manufacture and market.

A specific object of the present invention is to provide dosimetry which enables the user to compensate for whatever sun screen is being used, if any.

The approach of the present invention is to indicate the accumulated dosage of ultraviolet radiation transmitted to the skin of the user through a substance that protects the skin by having a predetermined value of inhibition to the radiation. The radiation is sensed in order to develop a signal which corresponds to the level of the radiation. That signal is processed to accumulate a representation of the magnitude of the signal as effectively integrated with elapsed time of exposure to the radiation. An indication of the degree of that accumulation is yielded in response to the representation. The determination of the degree at which the indication is yielded is adjusted in correspondence with the value.

The features of the present invention which are believed to be patentable are set forth with particularity in the appended claims.

The organization and manner of operation of specific embodiments of the invention, together with further objects and advantages thereof, may best be understood by reference to the following description taken in connection with the accompanying drawings in the several figures of which like reference numerals identify like elements, and in which.

Figure 1:
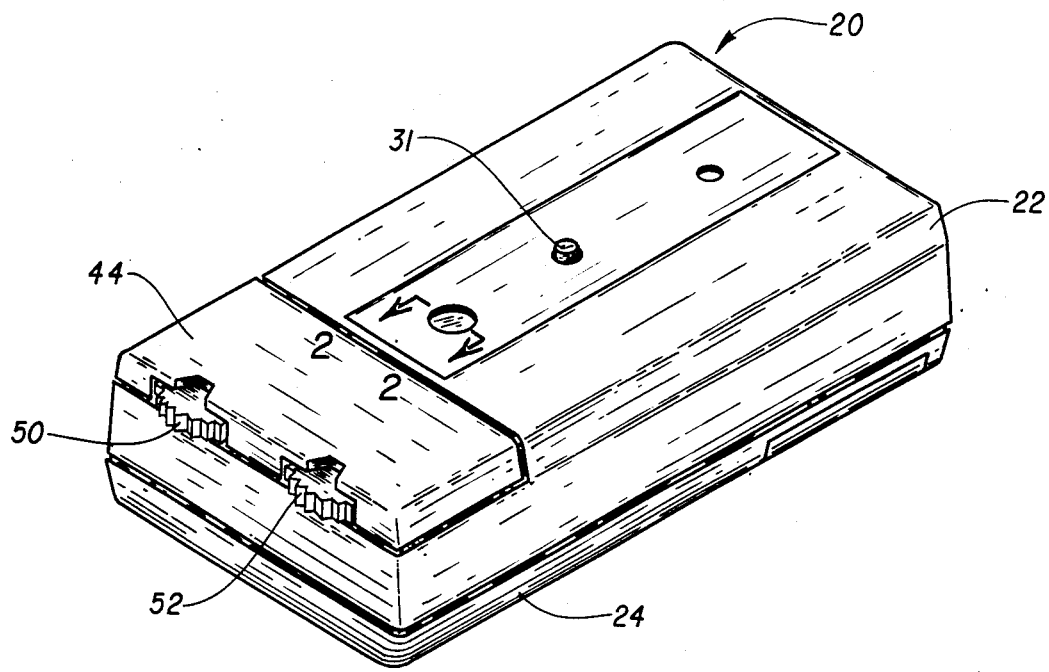
FIG. 1 is an isometric view of a dosimeter.

An ultraviolet dosimeter 20 has an upper cover 22 secured to a lower cover 24 by a screw 26 so as to form a housing. A decal 28 seats within a recess 30 on the top surface of upper cover 22 and carries suitable legends to identify at least a reset button 31 as well as having an opening 32 for that button, an opening 34 to serve as a sound outlet and an opening 36 which allows the entrance into the unit of ultraviolet radiation. Openings 32, 34 and 36 are aligned with respective ports 38, 40 and 42 formed through the bottom of recess 30.

Atop one end portion of upper cover 22 is a bezel 44 having cutouts 46 and 48 through which protrude respective thumbwheels 50 and 52 captivated by bezel 44 against corresponding friction rings 54 and 56 and by means of a plurality of screws as shown. On the underside of thumbwheels 50 and 52 are radially disposed ribs (not shown) which cooperate with circumferentially disposed lugs 58 and 60 circumferentially spaced around a corresponding pair of openings 62 and 64 formed through cover 22 and leading into the interior of the housing, with those ribs also cooperating with space-opposed limit stops 66 and 68. The structure described serves together to permit each of thumbwheels 50 and 52 to be rotationally indexed or detented among a series of different rotational positions in a manner which, as such, is known.

As shown, dosimeter 20 has a housing roughly the size and shape of a pocket radio. In this format, it easily may be provided with straps for mounting to the arm or other portion of the user, have a clip or pin for mounting to the user's wearing apparel or simply sit upon a horizontal surface nearby. For use in environments that may involve more vigorous activity, the housing could equally be affixed to the user by means of a wrist strap, like a wrist watch, or mounted to apparatus carried by the user. In connection especially with aquatic activity, it is within the contemplation of the disclosure to form the housing as a water-tight unit or to mount it within an exterior casing fully transparent to the ultraviolet radiation at least in the region of sensing port 42.

Lower cover 24 is divided by a transverse wall 70 into a battery and speaker compartment 72 and a circuitry compartment 74. Upstanding within compartment 74 are several posts 76 to the upper ends of which is secured a printed circuit board 78. Leads from board 78 continue through an opening 79 into compartment 72 to a conventional snap-fitting connector 80 of the kind, in this specific embodiment, attachable to a nine volt battery stored within compartment 72. Another set of leads from board 78 connect to a transducer 82 contained within compartment 72 but affixed by a self-adhesive layer 84 to the other side of recess 30 in alignment with port 40. Being essentially closed, chamber 72 serves as an acoustic backing to transducer 82 in order to aid the delivery by the transducer of an audio signal through port 40 and out opening 34 in order to be readily heard by the user. However, transducer 82 preferably emits sound at a sufficiently high level that careful acoustical design of chamber 72 is not required.

Circuit board 78 contains a layout of printed wiring on both its upper and lower surfaces for the purpose of interconnecting various electical components later to be described. Because the actual printed wiring will be arranged by a designer in whatever way is most feasible for the particular components selected, and this is conventional now in printed circuitry, the details of such printed circuitry are not shown.

Included in the printed circuitry, however, are radially displaced and circumferentially oriented pad segments generally indicated at 86 for accomodating adjustment of a skin-select feature under the control of thumbwheel 52. Similarly, an analogous arrangement of circumferentially oriented pads as indicated at 88 accomodate a lotion-select adjustment under the control of thumbwheel 50.

Projecting downwardly from respective ones of thumbwheels 50 and 52 are respective wiper assemblies 90 and 92 on the end surfaces of which are formed corresponding contacts that cooperate with pads 86 and 88 in order to achieve the necessary switching functions, to be further described, as between the different circumferencially-spaced series of pad segments. As such, of course, the cooperation of wipers and pads is well known in the switching art. Indeed, switches entirely separate from circuit board 78 could be employed and wired thereto. The particular arrangement illustrated is attractive, because, for each switch, only one movable element is necessary and it also carries the wipers, while what amount to the pads are simply part of the printed circuit board.

Reset switch 31 is simply a compressible-spring-loaded plunger on the bottom end of which is a conductive surface to enable an electrical bridging as between contacts 98 and 99 upwardly exposed on circuit board 78, all part of circuitry later to be discussed. Mounted on the underside of circuit board 78, in the embodiment shown, is a calibration rheostat 100.

Disposed on the upper surface of circuit board 78 is a sensor 102 of ultraviolet radiation to be further discussed hereinafter. Sensor 102 is mounted within a box 104 secured to the upper surface of board 78 by means of connecting leads. Sensor 102 is aligned beneath port 42 and opening 36. Compartment 72 is enclosed by a removable battery cover 73.

Figure 2:
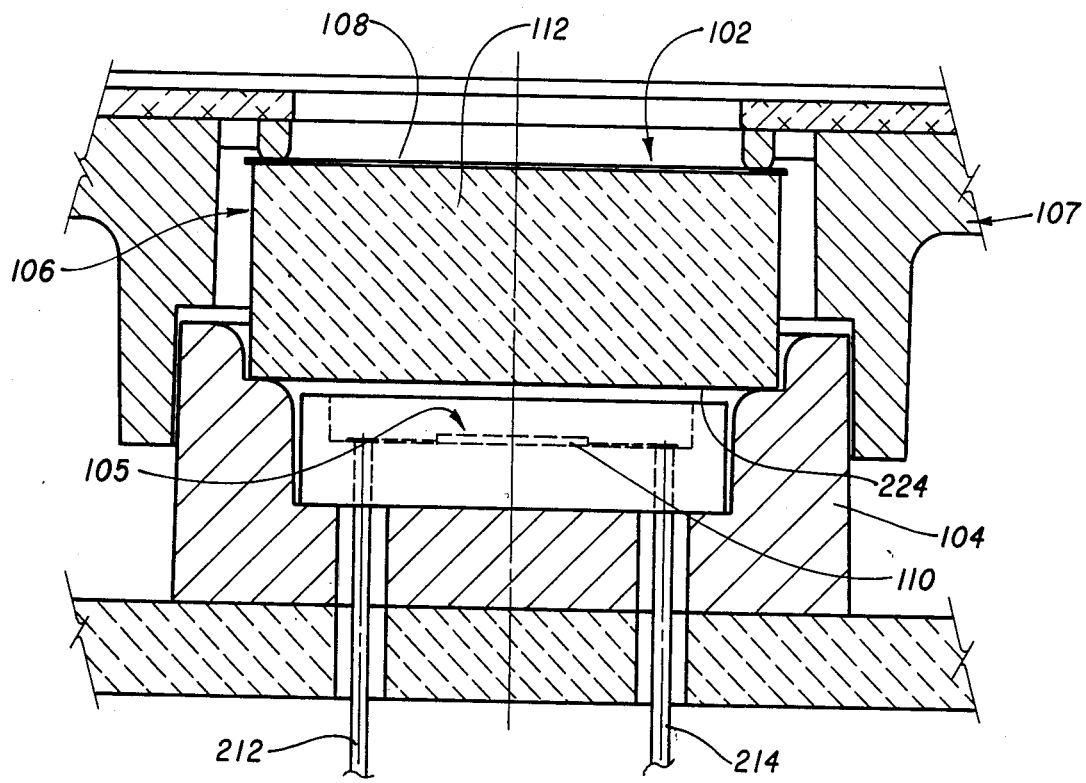
FIG. 2 is a fragmentary enlarged cross-sectional view taken along the line 2—2 in FIG. 1.

In this case, and as shown more fully in FIG. 2, sensor 102 includes a photo-electric element 105 combined with a filtration system 106 that permits only a selected bandwidth of radiation to impinge upon element 105. System 106 is captivated with respect to box 104 by a retainer 107. A radiation diffuser 108 may be disposed atop, or be incorporated within, system 106 in order to obtain or ensure adequate spreading of the selected radiation throughout the active area of element 105. Given appropriate material selection and fabrication technique, element 105 and system 106 may be combined into a single entity.

Figure 5:
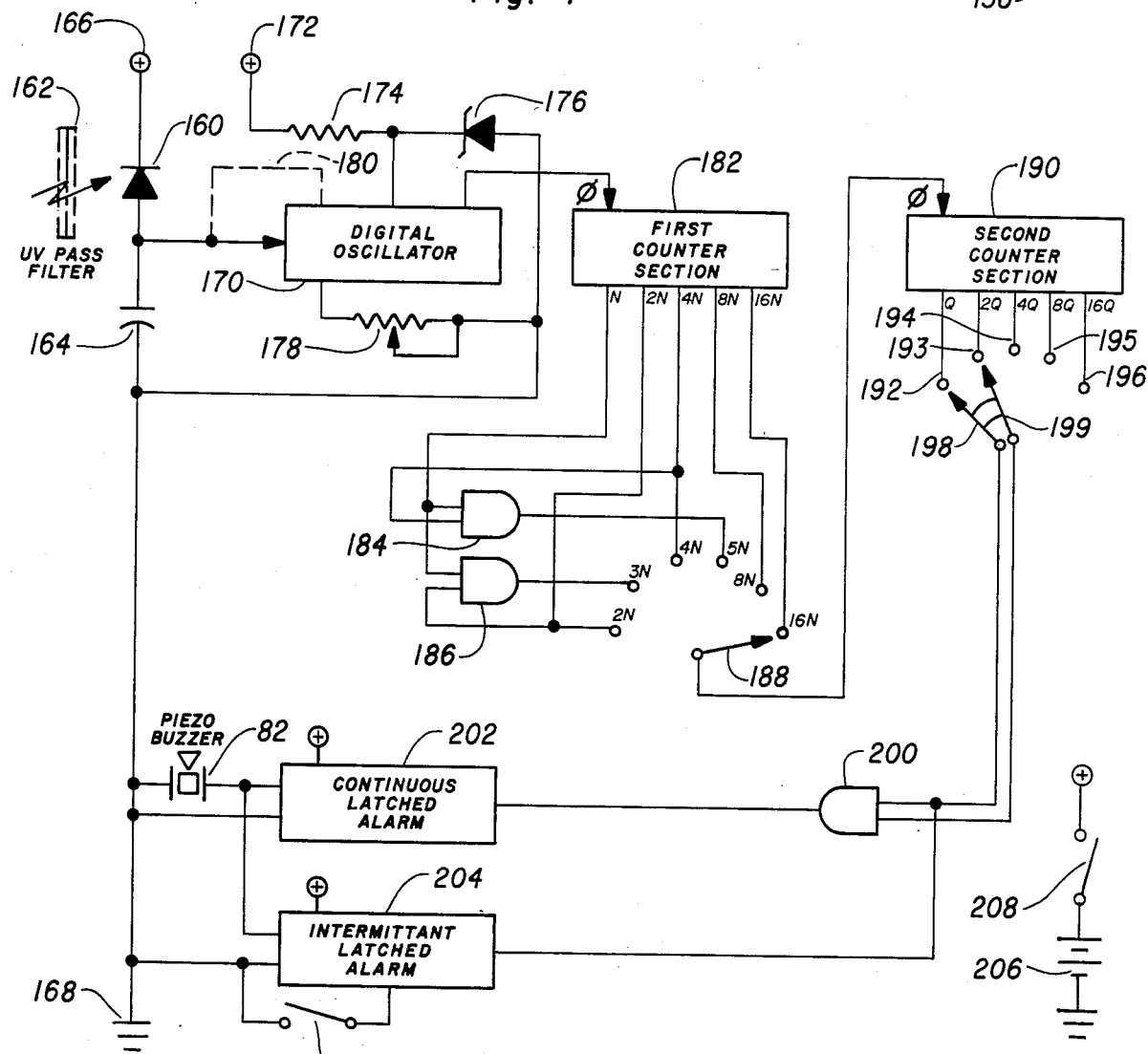
FIG. 5 is a schematic diagram of a preferred form of circuitry used in the apparatus of FIG. 1.
Figure 6:
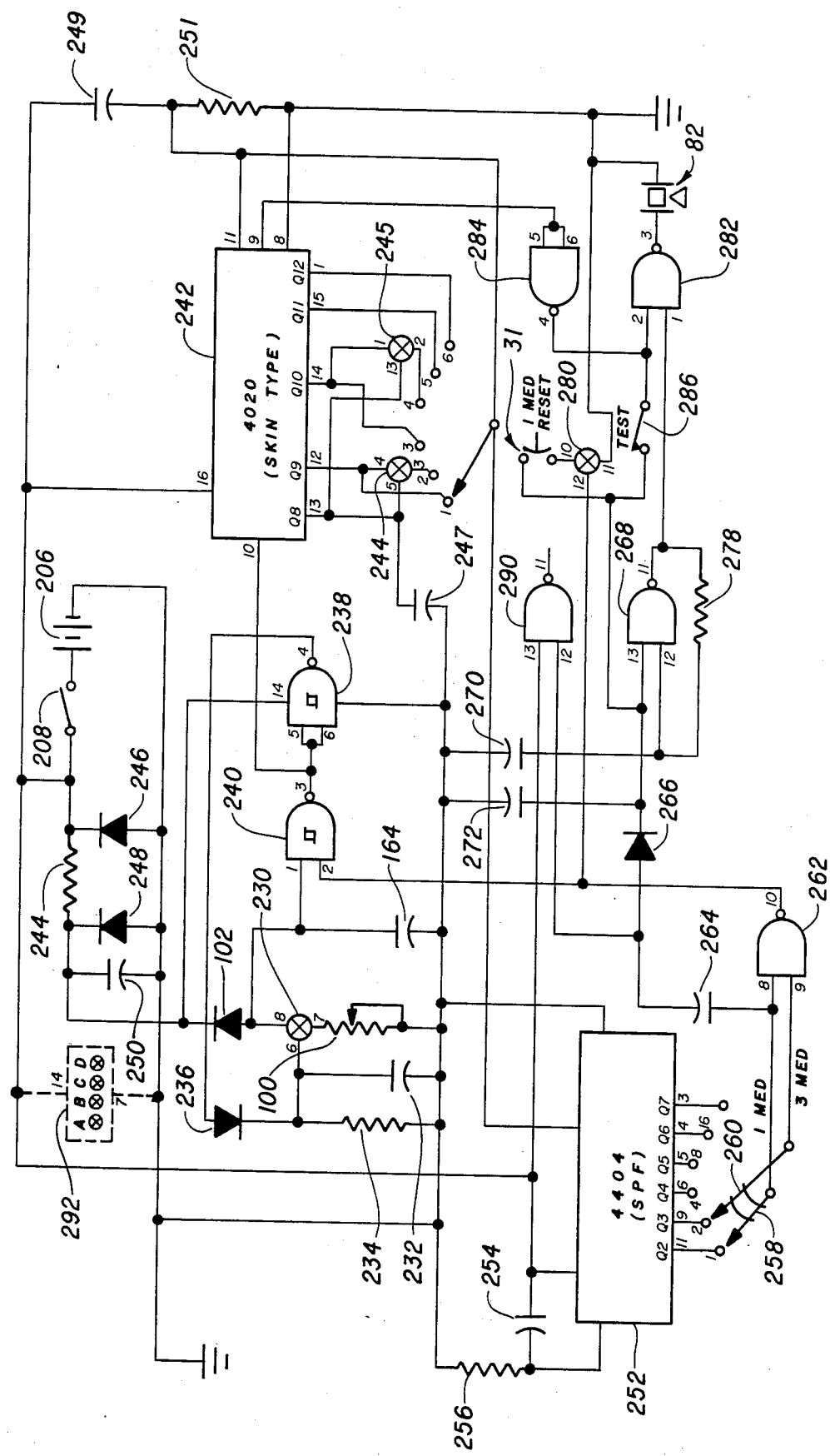
FIG. 6 is one more detailed implementation of the circuitry of FIG. 5.

The particular assembly represented in FIGS. 1 and 2 is especially designed to accomodate an approach which uses digital circuitry such as that depicted in FIGS. 5 and 6. It will be appreciated by those of ordinary skill in the art that such circuitry is now capable of being integrated into even a single chip dedicated thereto. Of course, that could eliminate even the need for any kind of printed circuit board or at least to a substantial simplification thereof. Nevertheless, in whatever form the ultimate apparatus may take there always will be a need to accommodate whatever is the sensor, the transducer, the means for adjustment and the power source. Even the power source may, in principle, be solar energized or involve at least storage from real or "artificial" solar-energy storage.

Figure 4:
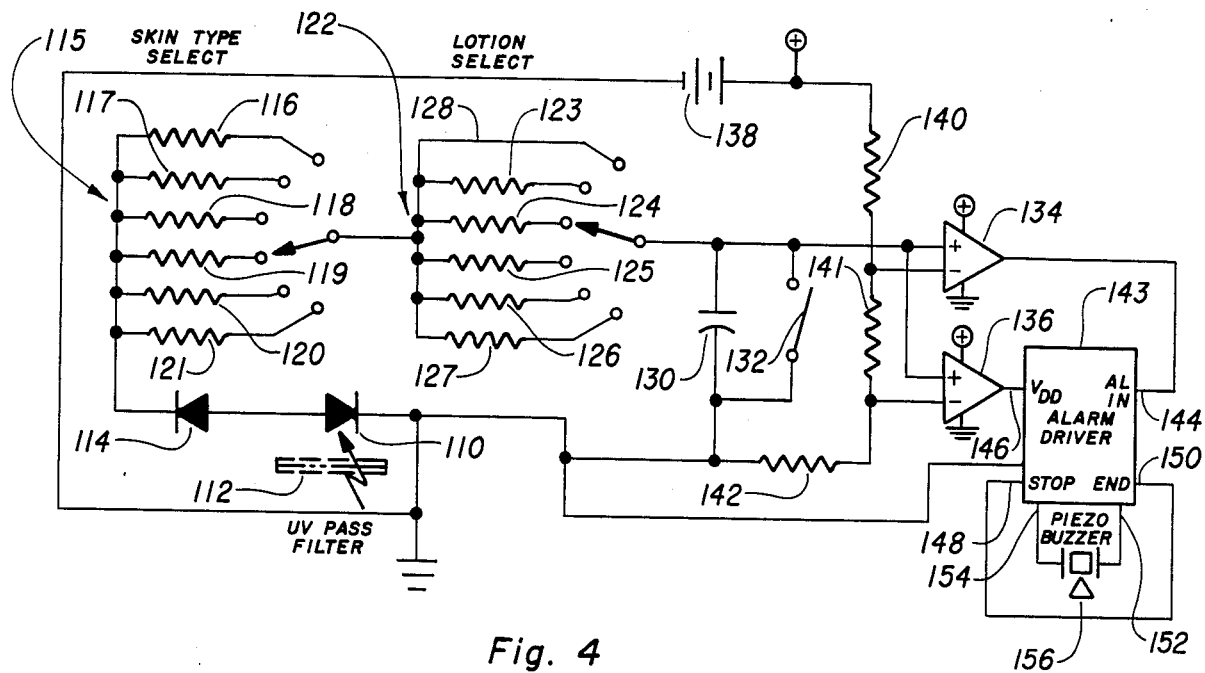
FIG. 4 is a schematic diagram of circuitry which may be used in the apparatus of FIG. 1.

Although possibly more expensive at least for high volume production and maybe less reliable by reason of dependence upon tolerances of components utilized, the basic approach of this invention may be carried out with an extemely-simple analog approach as schematically represented in FIG. 4. In that specific circuit, a photovoltaic detector 110 responds to ultraviolet radiation selectively received through a bandpass filter 112. Of course, photo-detector 110 might be other than photovoltaic, as long as it controlled the delivery of energy appropriately to a subsequent responsive device. Herein, detector 110 delivers energy through a diode 114 to a bank 115 of selectable series resistors 116, 117, 118, 119, 120 and 121 and into a subsequent serially-connected bank 122 of resistors 123, 124, 125, 126 and 127 all selectable in addition to a no-resistance path 128. Selection as among the different paths within bank 115 pertains to selecting the skin type of the user, while selection among the paths represented within bank 122 represents selectability as between different levels of inhibition applied to the user's skin of a sun screen in the form of a lotion or a cream.

While bank 115 preferably is included in the series combination, it may be eliminated in favor of only including bank 122. That is not a preferred approach, because it might mean that different models would have to be developed for persons of different skin types. Moreover, banks 115 and 122 could be serially interposed into the path from diode 114 in reverse order of appearance. Diode 114 is in this case included in order to prevent reverse current drainage from circuitry later to be described, and it will be understood by those of ordinary skill in the art that other circuitry might make that diode unnecessary.

In any case, the energy developed by detector 110 is, in this specific embodiment, delivered through banks 115 and 122 and is fed for storage into a capacitor 130 returned to ground and shunted by a reset switch 132. Beyond capacitor 130 are a pair of comparators 134 and 136 suitably powered as illustrated and having, in this case, plus terminals connected in common to the active end of capacitor 130. A battery 138 has its positive terminal led through a voltage divider composed of series-connected resistors 140, 141 and 142 back to ground. The other, or in this case negative, inputs of each of comparators 134 and 136 are respectively connected to the points between resistors 140–141 and 141–142. Thus, and in what is a conventional approach, the two comparators 134 and 136 respectively serve as an action signal source as compared with a reference signal source.

Contributing to the efficacy of the embodiment of FIG. 4 is the capability of using an off-the-shelf integrated ciriucit or chip 143 readily available and originally intended for something entirely different. As shown, this is the melodie IC designed to play a tune when installed in a greeting card and upon the opening of that card. Thus, it has an alarm input 144 connected to the output of comparator 134 and the typical $V_{DD}$ input 146 connected to the output of camparator 136. An alarm stop terminal 148 is connected to an "end" terminal 150 in order to allow pulse reset. Audio output terminals 152 and 154 are connected across a piezoelectic buzzer 156 that sounds the audible alarm. Of course, a variety of now-standard integrated circuits are available for use as alarm drivers.

In operation, capacitor 130 accumulates the dosage of ultraviolet radiation transmitted to the skin of the user and as derived by detector 110. The sensor of detector 110 and filter 112 detects the radiation and develops a signal corresponding to the level thereof, while that signal is subsequently processed through comparators 134 and 136 and in conjunction with capacitor 130 to accumulate a representation of the magnitude of the signal as effectively integrated with elapsed time of exposure to the radiation. Comparators 134 and 136, in cooperation with integrated circuit 143, yield an indication of the degree of that accumulation in response to the representation of the magnitude of the signal received through the adjustable circuitry from the sensor. It will of course be evident that the sensor may be incorporated within different circuitry that controls the flow of current in response to ultraviolet radiation instead of generating a responsive voltage.

Resistor 142 may be adjustable for the purpose of serving the function of rheostat 100 mentioned earlier. Moreover, resistor banks 115 and 122 may be inserted in the position of resistor 142, so as to achieve the functions of lotion select and skin select by adjustment of the reference voltages for comparators 134 and 136. Still further, capacitor 130 may be in the form of a switch-selectable bank of capacitors in substitution for one of resistor banks 115 and 122, while the other of those resistor banks may be located as shown or positioned in place of or in series with resistor 142. Generally, however, capacitor banks are more expensive than resistor banks.

Figure 3:
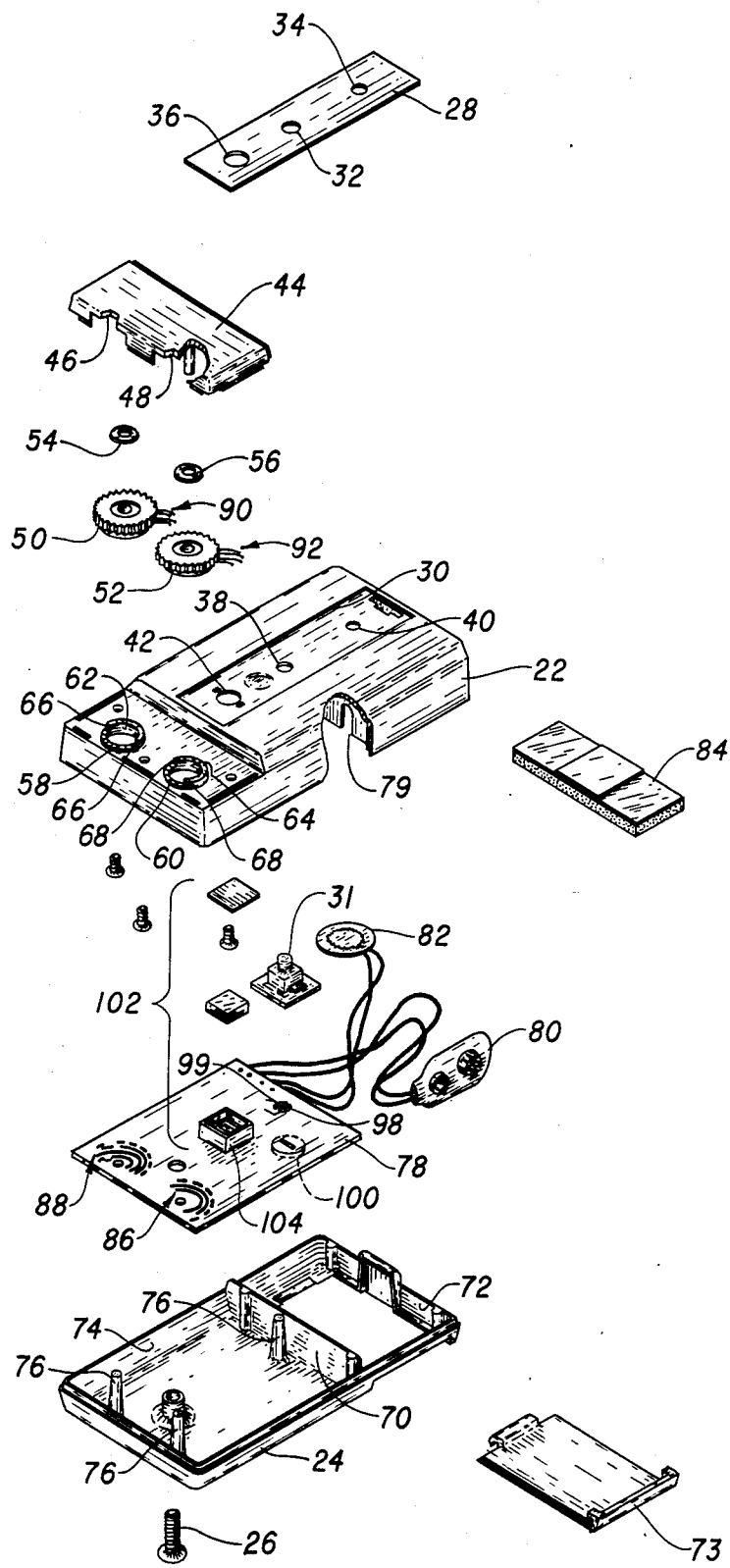
FIG. 3 is an exploded view of the apparatus shown in FIG. 1.

What is believed to be a more reliable and lesscostly approach is represented in FIG. 5. Here, a photo-detector 160 is used in a current-control mode to sense ultraviolet radiation delivered through a bandpass filter system 162 and directly connected in series with a memory capacitor 164 between a source of potential 166 and ground as represented at 168. The signal accumulated on capacitor 164 is fed to a current controlled digital oscillator 170 powered from a potential source 172 connected through a series resistor 174 and then shunted by a Zener diode 176 for stabilization. The return path for powering current is by way of a rheostat 178 back to ground, rheostat 178 basically serving the function as earlier ascribed to rheostat 100 as shown in FIG. 3. A feedback circuit 180, actually included internally within oscillator 170, connects the output of oscillator 170 effectively back to the junction between detector 160 and capacitor 164. This enables the ultraviolet-sensitive device 160 to be used as a feedback element in what becomes a Schmitt-trigger type of feedback oscillator. Thus, the frequency at which there is oscillation is proportional to and largely determined by the quantity of ultraviolet radiation incident on detector 160.

The voltage output of oscillator 170 is a square wave which is shaped and subsequently processed with the use of digital logic techniques. It will be observed that each oscillation represents a quantum amount of ultraviolet energy that can be precisely calibrated by a single adjustment at the time of assembly. This affords many advantages over the analog device of FIG. 4 or others, including easier, more precise adjustment for skin type and skin protection factors, as well as resulting in the need for only a single adjustment to calibrate the unit.

In the system of FIG. 5, oscillator 170 feeds its primary output signal to a counter 182 which provides outputs as indicated at the direct count N and at multiples of 2N, 4N, 8N and 16N. The base count N is fed to one input of each of AND gates 184 and 186, while terminal 2N is fed to the other input of gate 186 and terminal 4N is fed to the other input of gate 184. The output of gate 184 is analogous to 5N, while the output of gate 186 is analogous to 3N. The resulting array of available signals is fed to a six-position switch 188 the selected output of which is fed to a second counter 190. Counter 182 serves as an adjustment for skin-type. As mentioned above, different persons have different skin characteristics, and these have been at least somewhat standardized into six different categories. As related to the one MED dosage for minimul earythema, it is understood that a skin factor of I corresponds to a dosage of 20 millijoules per square centimeter, while skin factors II through VI correspond to the same unit in terms, respectively, of 30, 40, 50, 80 and 160. Using for counter 182 a normal binary scale, it will be observed that AND gates 184 and 186 are so interconnected as to allow selective outputs that rather closely correspond to the six different recognized skin factors.

The signal from switch 188 is fed to second counter 190, as mentioned, and this has the duty of being the lotion selector. That is, it allows adjustment of the unit to accomodate whatever sun screen, suntan lotion, or by whatever name it is called, that has been applied to the skin of the user. Counter 190 again has the usual scaling of 1, 2, 4, 8 and 16. The scaler outputs are connected respectively to terminals 192, 193, 194 195 and 196. A pair of wipers 198 and 199 are ganged, so that, at any given switch position, there are produced successive scaler quantities which individually are fed to the respective inputs of an AND gate 200.

Standardized values of the skin protection factor (SPF) are categorized into twenty-two levels, ranging from a value of one for no protection to a value of twenty-two for essentially one-hundred percent protection. As a practical matter, most manufacturers of sun screen lotions or creams only market a related line of their products with but a few of the different possible SPF levels, because the differences from one level to the next within all twenty-two are too small to be of significance in connection with use which may involve the variations in dust which might have affixed itself to the skin or the thickness of the sun screen as applied by the user. Accordingly, a typical product range might include SPF's of two, four, eight and sixteen which correspond respectively to ultraviolet absorption in the amounts of 50%, 75%, 82.5% and 94% of the incident ultraviolet radiation. In this embodiment, the four switch positions of ganged wipers 198 and 199 are selected to correspond to those values.

The output from gate 200 is fed to a continuous latched alarm 202. When the count from gate 200 exceeds a threshhold established within alarm 202, a continuous energizing signal is fed to a piezolectric transducer 82. The sounding of that continuous alarm tells the user that it is time to put on clothing or otherwise get out of the radiation for the remainder of that day.

Also included in the embodiment of FIG. 5 is an intermittent latched alarm 204 fed with the signal on wiper 198. That signal from wiper 198 tells alarm 204 that counting is occurring. Alarm 204 energizes transducer 82 only intermittently so as to cause the transducer to emit a periodic brief chirp. It will be recognized that the emitting of that chirp is essentially an assurance to the user that a battery 206 which powers the dosimeter is still operative. Besides indicating, by the absence of the chirp, that the battery has failed, alarm 204 provides a reasonable degree of assurance that all of the circuitry also is operating, because its input is derived from an output of the last counter in the system. In an alternative, alarm 204 may simply monitor the voltage level of battery 206 and energize tranducer 82 with a chirp or other special signal in response to the beginning of failure of the battery. That approach is now well known in the art which pertains to smoke and fire alarms.

In use, intermittant alarm 204 latches into a discontinuous alarm state when one MED equivalent radiation has been accumulated. This alarm may be discontinued by closing reset switch 31 momentarily, without disturbing the accumulation of radiation. Continuous alarm 202 latches into the alarm state when three MED equivalent radiation has been accumulated. In that case, alarm 202 continues to sound until power is discontinued to the unit by placing rotary selector switch 188 into an off position which is included in the arrangement of the pads and wipers associated with thumbwheel 52.

This approach permits the user to begin each exposure period from a known point rather than assuming some kind of theoretical recovery rate of the user's skin which may or may not actually be representative and especially as it might relate to long-term effects. It is contemplated also to include a manually operable switch 208 connected in series with battery 206, so as to allow complete disablement of the entire unit, including alarm 202, for storage during times at which it is not being used. Of course, the user may achieve the benefit of this feature, when switch 208 is not included, simply by disconnecting the battery from connector 80.

Basically, photodiode 110 is conventional and in itself would respond to optical radiation over a wide range of wavelengths varying from within the visible spectrum and through the ultraviolet as well as into the near infrared spectrum. That is, photodiode 110 modulates the current through it in one direction from a power source (the battery in this case) in a manner which is proportional to the photons impinging upon its surface. In principle, photodiode 110 could be replaced by a photovoltaic device that generated electrical energy in response to incoming radiation, but that approach does not appear at present to be an economical alternative.

In any event, photodiode 110 has its connecting leads 212 and 214 insulatingly projecting through the base of housing 104 for connection to the wiring of circuit board 78. Photodiodes 110 of FIG. 4 or 160 of FIG. 5 are disposed beneath an ultraviolet band pass filter 112 as depicted in FIG. 4 or 162 as denominated in FIG. 5. For convenience, the numbers to be used immediately hereinafter will be taken from those discussed with respect to FIG. 4, it being observed that the numbers applied to the photodetectors or ultraviolet filter systems of others of the figures are substitutable.

Photodiode 110 is disposed within housing 104 beneath a filter 112 secured in place within housing 104 above photodiode 110. In this case, a coating 224 of silver is applied to the undersurface of filter 112 that faces photodiode 110. In an alternative, coating 224 may be placed on the upper surface of filter 112 against which the radiation impinges. That may be less preferable as to location, because of the danger, during assembly or subsequent repair, of injuring the silver coating, as well as because of corrosion or other effect upon the silver as a result of exposure to the environment. Preferably, filter 112 is sealed into place by the use of an epoxy or the like.

Ultraviolet energy has been technically classified in terms of both one MED equivalent energy within a range designated as UVB, which extends from 285 to 320 nanometers, and one MED equivalent energy of UVA which extends from 320 to 400 nanometers. The ratio of one MED equivalent energies as between those two ranges is recognized as being approximately one to twelve-hundred. In the preferred embodiment, filter 112 passes the band of radiation in overlapping range basically between 300 and 340 nanometers.

Use of the preferred overlapping range between UVA and UVB accomodates the diurnal variation of the solar spectrum as a function of wavelengths. That is, the ratio of the integrated incident energy from one wavelength band to another wavelength band within the range from 300 nanometers to 340 nanometers oan be shown to be proportionally constant over the range of diurnal variation regardless of season or latitude. By reference to known atmospheric absorption algorythms that have been published, it has been discovered that there is a uniformity of solar radiation incident on the upper atmosphere over the aforementioned range of wavelengths. Operation in the 300 to 340 nanometer wavelength range further affords the opportunity to build a bandpass filter the optical properties of which are determined by natural physical properties of the material rather than by use of controlled optical thicknesses and other techniques. The present approach guarantees error-free passband filters in mass production, yielding enhanced product quality. The approach presented allows a dosimeter to be ratiometrically calibrated for any bandwidth within the range of 300 to 380 nanometers. Diurnal variation curves also indicate that effectively zero energy below 300 nanometers in wavelength impinges on the earth's surface and can be ignored.

Basically, filter 112 can be composed of any material that will pass ultraviolet radiation. Silver layer 224 is applied with a thickness of about 2,200 Angstroms. Silver exhibits the unique property that it will pass light in a quantity which peaks at three-hundred twenty-two nanometers. Depending upon thickness, it falls off at the longer-wavelength end at somewhere between 340 and 380 nanometers. Toward the low end of wavelength, however, it rapidly drops in tranmissivity at 300 nanometers regardless of thickness. Another feature of using silver as a layer is that it totally blocks well beyond the response that photodiode 110 might otherwise receive from the near infrared. Infrared and visible light is reflected by the silver layer.

When one observes the transmission curve of an unsilvered filter glass, it will be observed that the transmission rises, with decreasing wavelength, at about 370 nanometers and extends to well below 300 nanometers. As mentioned, the silver layer takes care of inhibiting anything below 300 nanometers. At the peak of the transmission curve, there is approximately 72% transmission.

It may be also noticed that, at a higher level of about 700 nanometers, there is a breakthrough of approximately 1½ % transmission by unsilvered filter glass. That is in the infrared range and could render the device useless, because the response of at least most photodiodes is very high at that wavelength. By reason of these different responses of the photodiode as compared with the filter, it can be seen that the combination of the two filtering techniques is necessary in order to ensure that response of the dosimeter is within the correct range in respect of which it is calibrated. Thus, the embodied system is able to take advantage of the property of coating 224, because its bandpass is determined by physical properties that cannot change with aging or other defect as could occur in a photodiode. The combination of filter 112 and diode 110 results in it simply being a matter of linear calibration as between those two elements. If the unit is calibrated in the noonday sun, it will be accurate at other periods of time and with respect to other fringe wavelengths associated with radiation.

As may have been observed, the circuitry basically allows the user to obtain audible alarm at a selected level, depending upon that which he wishes to do. It may sound an alarm at a dosage of only 1 MED for those users who wish to avoid low-level, long-term skin damage. Yet, it is automatically set to a second level of alarm for those users who wish to obtain a suntan. At the same time, that alarm indication will protect as against a level of exposure below that of actual sunburn.

The analog circuitry of FIG. 4 is a straightforward implementation. That which is represented in FIG. 5 for a digital system is also fully capable of being implemented by a person of ordinary skill in the art for obtaining an operating system. Nevertheless, FIG. 6 depicts what currently is an initially preferred implementation of the approach and an indication of approach which ultimately probably will have all of the different basic components integrated into a dedicated chip that puts all active components into one little "box" mounted on circuit board 78, the need for circuit board 78 or something similar remaining only for the fact that physical use requires an area thereon or associated therewith for switches, the reset button and the transducer as well as the battery compartment.

Turning, then, to FIG. 6, one finds photodiode 102 interconnected through a transmission gate 230 to rheostat 100 which is the calibrator. The operation of gate 230 is modified by the function of time delay interposed by a capacitor 232 paralleled by a resistor 234, circuitry which receives a feedback signal by way of a diode 236 from the output of a second NAND gate 238 of an oscillator which also includes a NAND gate 240. The network of resistor 234 and capacitor 232 assists in keeping transmission gate 230 in its performance of bilateral operation. All NAND gates depicted in FIG. 6 are of the Schmidt type which exhibit hysteresis. A most important part, of course, is that afforded by memory capacitor 164; it accumulates the charge as produced by or modulated through the function of detector 102.

The supply of power from battery 206 by way of switch 208 is supplied through a filter composed of a series resistor 244 and fore and aft shunt diodes 246 and 248, over a capacitor 250 back to, and as, the current supplied to sensor 102.

In this case, transmission gate 230 is simply a switch which adjusts between an extremely high impedance when in the "off" condition and a very low impedance when in the "on" condition. A silicon controlled rectifier or the like might also be used.

A signal from the oscillator formed by gates 238 and 240 is fed to a standard 4020 counter 242 which corresponds in basic function to counter 182 of FIG. 5 and includes an interlacing of the outputs through additional transmission gates 244 and 245 as to yield skin-type indications in correspondence with the afore-discussed types I-VI. A bypass capacitor 247 is returned to ground from the junction between an input of gate 244 and the lowest-order output of counter 242. Usual decoupling from the power supply is provided by the input over a capacitor 249 shunted by a resistor 251.

From skin-type selector 242, the signal is led to another integrated circuit that herein is a standard 4404 which serves as a lotion selector 252. It is decoupled from but energized by connections back to the circuitry of battery 206 by a bridging capacitor 254 shunted by a resistor 256. As in the case of the more broadly disclosed circuitry of FIG. 5, a gang switch, composed of wiper arms 258 and 260, sweeps a plurality of output terminals, selectively, in order to determine the selection as between a 1 MED dosage (exhibited by the first position) to higher ratios.

The subsequent alarm circuitry is quite conventional and could be changed in many respects as might best suit economy or the availability of different chip packages that contain the various different gates and counters involved. In this particular case, wiper 258 is connected to one side of a comparator 262, while wiper 260 connects to the other side of that comparator. Wiper 258 also connects through a storage or memory capacitor 264 that leads through a diode 266 to another NAND gate 268 the comparative input of which is coupled through a capacitor 270 back to reference ground with a resistor 278 returning from the output terminal of gate 268 back to the upper end of capacitor 270. A capacitor 272 couples the output of diode 266 back to ground. It will be observed that a common connection as between gate 262 and one input of gate 240 is tied into a transmission gate 280.

The remainder of the circuitry is routine, the output from gate 268 feeding a gate 282 that energizes piezoelectric transducer 82. Another gate 284 connects between an output of counter 242 in order to accomodate a test switch 286 which lets at least the assembler, if not the ultimate user, determine that all circuits are "go". Reset switch 31 connects one input of gate 280 back to the junction between diode 266 and gate 268. An unused gate 290 is decoupled, as shown. All of the transmission gates are powered as indicated at 292.

In the operation of the circuits of FIG. 5 or 6, 256 pulses are assigned to correspond to a level of radiation which equates to ten millijoules per centimeter squared as applied to the skin. As a person of ordinary skill in the art will see from examining the schematics, that pulse correspondence is a feature which allows integration, threshhold and ultimate alarm.

Various embodiments are shown, and a number of modifications and alternatives have also been mentioned. Explicit definition of implementation of integrated-circuit components is of little importance as compared with the overall concept of accumulating dosage and sounding an alarm based only upon that response which is most meaningful and also is adjustable to allow the user his choice of that which he is willing or wanting to do. For example, one user may desire to acquire a dosage at the slowest possible rate to enable suntanning while yet avoiding any other adverse effects. Still another user might wish to reset the thumbwheels to obtain a greater dosage rate, leaving it to the future and his particular skin condition to determine how much aging might set in. Presumably, all users would appreciate the alarm factor that tells them when they are going to get blisters from sunburn. What has been disclosed accomodates design and production with regard to all of those variables with the facility of leaving it to the user to make his choice. Of course, the disclosed circuitry also may include implementation of a read-out of dose rate, should that also be desired.

While particular embodiments of the invention have been shown and described, and a number of alternatives and modifications have at least been suggested, it will be obvious to those of ordinary skill in the art that changes and modifications may be made without departing from the invention in its broader aspects. Therefore, the aim in the appended claims is to cover all such changes and modifications as fall within the true spirit and scope of that which is patentable.

We claim:

1. An ultraviolet radiation dosimeter comprising:
a sensor exposed to ultraviolet radiation impinging upon said sensor and responsive thereto for developing a signal corresponding to the level of said radiation, said sensor including a filter medium that exhibits a transmissivity of said radiation that rises at about three-hundred-seventy nanometers and extends to below three-hundred nanometers, and a filtering layer that exhibits a peak transmissivity at substantially three-hundred-twenty-two nanometers;
a processor responsive to said signal and accumulating a representation of the magnitude of said signal as effectively integrated with elapsed time of exposure of said sensor to said radiation;
and means responsive to said representation for yielding an indication of the degree of such accumulation.

2. An ultraviolet radiation dosimeter comprising:
a sensor exposed to ultraviolet radiation impinging thereupon and responsive thereto for developing a signal corresponding to the level of said radiation, and in which said sensor responds to a band of wavelengths selected to significally compensate for diurnal variations regardless of latitude and season;
a processor responsive to said signal and accumulating a representation of the magnitude of said signal as effectively integrated with elapsed time of exposure of said sensor to said radiation;
and means responsive to said representation for yielding an indication of the degree of such accumulation.

3. A dosimeter as defined in claim 3 in which said sensor includes a filter medium which is sealed with respect to ambient atmosphere.

4. An ultraviolet radiation dosimeter comprising:
a photo-electric element disposed to receive and respond to ultraviolet radiation;
a filtration system combined with said element and responsive to said radiation for permitting only a selected bandwidth of radiation to impinge upon said element;
said filtration system together with said element enabling response to a range approximately between three-hundred and three-hundred-forty nanometers with a first response characteristic, structured in terms of one minimal erythemal dose in a range approximately between two-hundred-eighty-five and three-hundred-twenty nanometers, and a second response characteristic, structured in terms of one minimal erythemal dose in a range approximately between three-hundred-twenty and four-hundred nanometers, to yield an overall passband between approximately three-hundred and three-hundred-forty nanometers.

5. An ultraviolet radiation dosimeter comprising:
a photo-electric element disposed to receive and respond to ultraviolet radiation;
a filtration system combined with said element and responsive to said radiation for permitting only a selected bandwidth of radiation to impinge upon said element;
and said filtration system together with said element exhibiting a response which enables accomodation for dirunal variation of the solar spectrum as a function of wavelength in order that the ratio of energy incident on said element substantially is constant over said range reasonably throughout all seasons of a calendar year and at various latitudes as defined on the earth.

6. An ultraviolet radiation dosimeter comprising:
a photo-electric element disposed to receive and respond to ultraviolet radiation;
a filtration system combined with said element and responsive to said radiation for permitting only a selected bandwidth of radiation to impinge upon said element;
and said filtration system including a layer of material which exhibits a peak transmissivity to said radiation substantially at three-hundred-twenty-two nanometers.

7. A dosimeter as defined in claim 6 in which said layer is composed of silver.

8. A dosimeter as defined in claim 7 in which said layer has a thickness substantially of twenty-two-hundred Angstroms.

9. An ultraviolet radiation dosimeter comprising;
a photo-electric element disposed to receive and respond to ultraviolet radiation;
a filtration system combined with said element and responsive to said radiation for permitting only a selected bandwidth of said radiation to impinge upon said element;
and a diffuser of said radiation combined with said system for spreading radiation within said selected bandwidth throughout the active area of said element.

10. An ultraviolet dosimeter comprising:
a photo-electric element disposed to receive and respond to ultraviolet radiation;
means for producing a signal having a value representative of the quantity of said radiation received by said element;
means for yielding an indication;
first energizing means for said indication means and responsive to said value for producing a continuous indication when said value accumulates to a predetermined threshold level;
and second energizing means for said indication means and responsive to said signal for producing a discontinuous indication when said value has accumulated to less than said predetermined level but a value which corresponds to an excess over substantially one minimal erythemal dose of said radiation.

11. A dosimeter as defined in claim 10 in which said first energizing means produces said continuous indication when said accumulated value corresponds to an accumulation of said radiation in excess over substantially three minimal erythemal doses of said radiation.

12. A dosimeter as defined in claim 10 which further includes means for selectively deactivating only said second energization means.

13. A dosimeter as defined in claim 10 in which the frequency of said discontinuous signal indication varies in correspondence with said level of said signal.

* * * * *